United States Patent [19]

Karashima et al.

[11] Patent Number: 4,554,606
[45] Date of Patent: Nov. 19, 1985

[54] MAGNETIC RECORDING MEDIUM

[75] Inventors: Takato Karashima, Nishinomiya; Hiroshi Zaitsu, Takatsuki, both of Japan

[73] Assignee: Hitachi Maxell, Ltd., Osaka, Japan

[21] Appl. No.: 433,910

[22] Filed: Oct. 12, 1982

[30] Foreign Application Priority Data

Oct. 13, 1981 [JP] Japan ................... 56-163620

[51] Int. Cl.[4] ............ G11B 23/00; B32B 7/02
[52] U.S. Cl. ...................... 360/131; 428/212; 428/900
[58] Field of Search ............ 360/131; 428/212, 900; 427/131

[56] References Cited

U.S. PATENT DOCUMENTS 4,075,384  2/1978  Suzuki et al. ............. 360/131 X
4,210,946  7/1980  Iwasaki et al. ............ 360/131
4,423,453  12/1983  Kawahara et al. .......... 360/131

Primary Examiner—John H. Wolff
Attorney, Agent, or Firm—Birch, Stewart, Kolasch & Birch

[57] ABSTRACT

A magnetic recording medium having two magnetic layers, which comprises an upper magnetic layer and a lower magnetic layer, said lower magnetic layer having a coercive force of at least 100 oersteds, preferably 100 to 500 oersteds, lower than that of the upper magnetic layer, the thickness of the upper and lower magnetic layers being in the ratio of the thickness of the upper magnetic layer to that of the lower magnetic layer of 1/1 to 1/9, and the total coercive force of the upper and lower magnetic layers being 1,000 oersteds or more. The magnetic recording medium has excellent sensitivity and frequency characteristics at low and high frequency bands with less noise.

4 Claims, 2 Drawing Figures

MAGNETIC RECORDING MEDIUM

BACKGROUND OF THE INVENTION

The present invention relates to a magnetic recording medium having two magnetic layers, more particularly a magnetic recording medium having an upper magnetic layer of a higher coercive force and a lower magnetic layer of a lower coercive force, which has improved sensitivity and frequency characteristics at low and high frequency bands with less noise.

It is known that a magnetic recording medium having two magnetic layers a lower layer of a lower coercive force and an upper layer of a higher coercive force shows improved sensitivity and frequency characteristics at low and high frequency bands, and further that when magnetic metallic particles having a large maximum magnetization are used as the magnetic particles for the magnetic layer, the sensitivity and frequency characteristics are further improved. Such a magnetic recording medium is usually produced by first applying a magnetic paint composition containing magnetic metallic particles of a comparatively lower coercive force onto a base film, such as polyester film, and drying to form a lower magnetic layer, and secondly applying a magnetic paint composition containing magnetic metallic particles of a comparatively higher coercive force onto the lower magnetic layer and then drying to form an upper magnetic layer.

However, the conventional magnetic recording medium having two magnetic layers obtained by using magnetic metallic particles has a difference in the coercive forces between the upper and lower magnetic layers of less than 100 oersteds, and such a magnetic recording medium shows insufficient improvement in the sensitivity and frequency characteristics at low and high frequency bands and still shows noise.

The present inventors have intensively studied so as to improve the magnetic recording medium having two magnetic layers concentrating on the difference of coercive force between the upper and lower magnetic layers. As a result, it has been found that a desired magnetic recording medium of two magnetic layers having excellently improved sensitivity and frequency characteristics at low and high frequency bands with less noise can be obtained by forming a lower magnetic layer having a coercive force of at least 100 oersteds lower than that of the upper magnetic layer, making the ratio of thickness between the upper magnetic layer and the lower magnetic layer (i.e. the thickness of the upper magnetic layer/the thickness of the lower magnetic layer) in the range of 1/1 to 1/9, and further making the total coercive force of the upper and lower magnetic layers 1,000 oersteds or more.

SUMMARY OF THE INVENTION

An object of the present invention is to provide a magnetic recording medium having two magnetic layers which has highly improved sensitivity and frequency characteristics at low and high frequency bands with less noise. Another object of the invention is to provide a magnetic recording medium having two magnetic layers wherein the lower magnetic layer has a coercive force of at least 100 oersteds lower than that of the upper magnetic layer and the thickness ratio of the upper and lower magnetic layers is in a specified range. These and other objects and advantages of the invention will be apprent to persons skilled in the art from the following description.

BRIEF DESCRIPTION OF THE DRAWINGS

The magnetic recording medium of the present invention is illustrated in more detail below with reference to the accompanying drawing.

DETAILED DESCRIPTION

Figure 1:
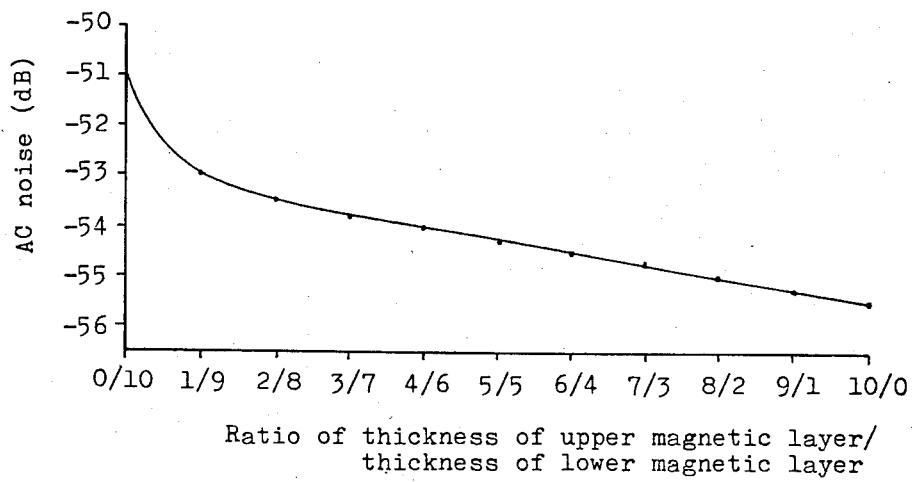
FIG. 1 shows a relation between AC noise and the ratio of thicknesses of the upper and lower magnetic layers of the magnetic tape of the present invention.

The magnetic recording medium of the present invention is produced by forming the upper and lower magnetic layers, so that the lower magnetic layer has a coercive force of at least 100 oersteds lower than that of the upper magnetic layer. When the difference of coercive force between the upper and lower magnetic layers is smaller than 100 oersteds, the magnetic recording medium shows still undesirable noise and shows also insufficiently improvement in the sensitivity and frequency characteristics at low and high frequency bands. On the other hand, when the difference of the coercive force between the upper and lower magnetic layers is more than 500 oersteds, the magnetic recording medium may occasionally show inferior frequency characteristics at a low frequency band. Thus, the difference of coercive force between the upper and lower magnetic layers is preferably in the range of 100 to 500 oersteds, more preferably 200 to 400 oersteds.

The upper and lower magnetic layers have preferably a total coercive force of 1,000 oersteds or more, usually 2,000 to 5,000 oersteds. When the total coercive force of the upper and lower magnetic layers is less than 1,000 oersteds, the magnetic recording medium shows unfavorably inferior frequency characteristics at a high frequency band.

The thicknesses of the upper and lower magnetic layers are preferably in the ratio of 1:1 to 1:9 (the thickness of the upper magnetic layer:the thickness of the lower magnetic layer). When the thickness of the upper magnetic layer is larger than that of the lower magnetic layer, the magnetic recording medium shows inferior output level at a low frequency band, and on the other hand, when the thickness of the upper magnetic layer is too small as compared with that of the lower magnetic layer, the magnetic recording medium shows increased noise and also low output level at a high frequency band.

These upper and lower magnetic layers can be formed by a conventional method. For example, a magnetic paint composition containing magnetic metallic particles, a binder, an organic solvent and other conventional additives may be applied onto a base film, such as polyester film, in a usual manner and then dried to form a lower magnetic layer having a prescribed coercive force, and thereafter, a magnetic paint composition containing magnetic metallic particles, a binder, an organic solvent and other conventional additives is applied onto the lower magnetic layer in a usual manner and then dried to form an upper magnetic layer having a coercive force of at least 100 oersteds higher than that of the lower magnetic layer.

The magnetic metallic particles used for the preparation of magnetic paint composition include all conventional magnetic metallic particles, such as magnetic α-iron metal particles, magnetic nickel-cobalt alloy particles, magnetic iron-nickel-cobalt alloy particles, and the like. The magnetic metallic particles for the upper and lower magnetic layer are usually the same kind of particles other than the coercive force, but may be different kind of particles. The magnetic metallic particles for the upper magnetic layer have a coercive force of at least 100 oersteds, preferably 100 to 500 oersteds, higher than that of the magnetic metallic particles for the lower magnetic layer.

The binder used for the preparation of magnetic paint composition is not critical and includes all conventional binders such as vinyl chloride-vinyl acetate copolymer, polyvinylbutyral, polyurethane resins, nitrocellulose, or the like. The organic solvent is not critical either and includes all conventional organic solvents, such as toluene, methyl isobutyl ketone, methyl ethyl ketone, cyclohexanone, tetrahydrofuran, ethyl acetate, or the like. The magnetic paint composition may also contain other conventional additives such as dispersing agents, lubricating agents, polishing agents, anti-static agents, or the like.

PREFERRED EMBODIMENTS

The present invention is illustrated by the following Examples but should not be construed to be limited thereto.

EXAMPLE 1

Preparation of a magnetic paint composition for a lower magnetic layer:

| Ingredients | Part by weight |
| --- | --- |
| Magnetic α-Fe particles (coercive force: 1,100 oersteds) | 100 |
| Esreck A-5 (vinyl chloride-vinyl acetate-vinyl alcohol copolymer, manufactured by Sekisui Chemical Co.) | 9.1 |
| Pandex T-5250 (urethane elastomer, manufactured by Dainippon Ink Co.) | 9.1 |
| Colonate L (trifunctional low molecular weight isocyanate compound, manufactured by Nippon Polyurethane Kogyo K.K.) | 4.5 |
| Red oxide | 2 |
| Carbon black | 0.7 |
| Myristic acid | 0.7 |
| Cyclohexanone | 95 |
| Toluene | 95 |

The above ingredients are mixed for about 48 hours with a ball mill to prepare a magnetic paint composition for a lower magnetic layer.

Preparation of a magnetic paint composition for an upper magnetic layer:

| Ingredients | Part by weight |
| --- | --- |
| Magnetic α-Fe particles (coercive force: 1,400 oersteds) | 100 |
| Esreck A-5 | 12.5 |
| Takerack E-551 (urethane prepolymer, manufactured by Takeda Chemical Industries) | 8.0 |
| Colonate L | 2.3 |
| Red oxide | 2 |
| Carbon black | 1 |
| Myristic acid | 0.8 |
| KF 96 H (silicone, manufactured by Shinetsu Chemical Co.) | 0.4 |
| Methyl isobutyl ketone | 100 |
| Toluene | 100 |

The above ingredients are mixed for about 48 hours with a ball mill to prepare a magnetic paint composition for an upper magnetic layer.

Preparation of a magnetic tape having two layers:

The magnetic paint composition for a lower magnetic layer prepared above is applied onto a polyester film (thickness: 12μ) and dried. After surface-treatment, the coated composition is cured at 60° C. for 24 hours to form a lower magnetic layer (thickness: 2.8μ). Onto the lower magnetic layer is applied the magnetic paint composition for an upper magnetic layer prepared above and then it is dried. By subjecting to surface-treatment and curing likewise, there is formed an upper magnetic layer (thickness: 1.8μ). The resulting product is cut in a prescribed width to obtain a magnetic tape having two magnetic layers.

EXAMPLE 2

In the same manner as described in Example 1 except that the thickness of the upper and lower magnetic layer formed on the polyester film are varied, while the total thickness of both of the layers is maintained the same as in Example 1, there are obtained various magnetic tapes having two magnetic layers.

Figure 2:
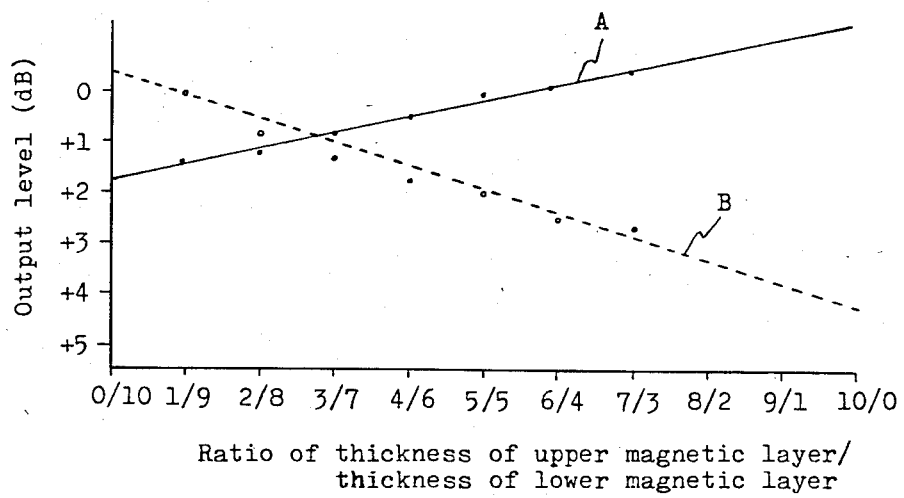
FIG. 2 shows a relation between the output level at a frequency of 1 KHz and the ratio of thicknesses of the upper and lower magnetic layers (graph A), and a relation between output level at a frequency of 10 KHz and the ratio of thicknesses of the upper and lower magnetic layers (graph B).

As to the magnetic tapes, AC noise (noise at alternating current), output level at frequency of 1 KHz and 10 KHz were measured. The results are shown in the accompanying FIGS. 1 and 2. FIG. 1 shows the relation between AC noise and the ratio of thicknesses of the upper and lower magnetic layers. The graph A of FIG. 2 shows the relation between output level at a frequency of 1 KHz and the ratio of thicknesses of the upper and lower magnetic layers, and the graph B thereof shows the relation between output level at a frequency of 10 KHz and the ratio of thicknesses of the upper and lower magnetic layers.

As is clear form these figures, when the thickness of the upper magnetic layer becomes larger than the ratio to that of the lower magnetic layer of 1:9, AC noise decreases largely, but on the other hand, when the thickness of the upper magnetic layer becomes smaller than the ratio of 1:9, the output level at a frequency of 10 KHz becomes lower, and further, when the thickness of the upper magnetic layer becomes larger than 5:5, the output level at a frequency of 1 KHz becomes lower. These results mean that the ratio of the thickness of the upper magnetic layer to that of the lower magnetic layer is preferably in the range of 1:1 to 1:9.

EXAMPLE 3

In the same manner as described in Example 1 except that the magnetic α-Fe particles having a coercive force of 1,400 oersteds used for the magnetic paint composition for an upper magnetic layer is replaced by the same amount of magnetic α-Fe particles having a coercive force of 1,500 oersteds, there is obtained a magnetic tape having two magnetic layers.

EXAMPLE 4

In the same manner as described in Example 1 except that the magnetic α-Fe particles having a coercive force of 1,100 oersteds used for the magnetic paint composition for a lower magnetic layer is replaced by the same amount of magnetic α-Fe particles having a coercive force of 1,000 oersteds, and the magnetic α-Fe particles having a coercive force of 1,400 oersteds used for the magnetic paint composition for an upper magnetic layer is replaced by the same amount of magnetic α-Fe particles having a coercive force of 1,500 oersteds, there is obtained a magnetic tape having two magnetic layers.

REFERENCE EXAMPLE

In the same manner as described in Example 1 except that the magnetic α-Fe particles having a coercive force of 1,400 oersteds used for a magnetic paint composition for an upper magnetic layer is replaced by the same amount of magnetic α-Fe particles having a coercive force of 1,190 oersteds, there is obtained a magnetic tape having two magnetic layers.

As to the magnetic tapes obtained in Examples 1, 3 and 4 and Reference Example, the total coercive force of both upper and lower magnetic layers, each coercive force of the upper and lower magnetic layers, AC noise at 1 KHz, frequency characteristics at 1 KHz and 10 KHz, and sensitivity at 315 Hz were measured. The results are shown in the following table.

| | coercive force Hc (Oe) | | | Ac noise (dB) | Sensi- tivity (dB) | Frequency characteristics (dB) | |
|---|---|---|---|---|---|---|---|
| | Lower layer | Upper layer | Dif- fer- ence | | | 1 KHz | 10 KHz |
| Ex. 1 | 1,100 | 1,400 | 300 | −54.0 | +1.9 | +1.0 | +2.0 |
| Ex. 3 | 1,100 | 1,500 | 400 | −55.0 | +0.3 | +0.6 | +3.0 |
| Ex. 4 | 1,000 | 1,500 | 500 | −55.0 | −1.0 | +0.5 | +4.0 |
| Ref. | 1,100 | 1,190 | 90 | −51.0 | +2.5 | +0.4 | −1.6 |

-continued

| | coercive force Hc (Oe) | | | Ac noise (dB) | Sensi- tivity (dB) | Frequency characteristics (dB) | |
|---|---|---|---|---|---|---|---|
| | Lower layer | Upper layer | Dif- fer- ence | | | 1 KHz | 10 KHz |
| Ex. | | | | | | | |

As is clear from the above data, the magnetic tapes having two magnetic layers obtained in the Examples show superior frequency characteristic and sensitivity with less noise in comparison with the magnetic tape obtained in the Reference Example. Thus, the magnetic tape having the two magnetic layers of the present invention shows substantially improved frequency characteristics and sensitivity at low and high frequency bands with less noise.

The invention being thus described, it will be obvious that the same may be varied in many ways. Such variations are not to be regarded as a departure from the spirit and scope of the invention, and all such modifications as would be obvious to one skilled in the art art intended to be included within the scope of the following claims.

What is claimed is:

1. A magnetic recording medium comprising a non-magnetic support having thereon two magnetic layers, an upper magnetic layer and a lower magnetic layer, each of said magnetic layers consisting essentially of magnetic metallic particles dispersed in a binder said lower magnetic layer having a coercive force of at least 100 oersteds lower than that of said upper magnetic layer, the thicknesses of the upper and lower magnetic layers being in the ratio of the thickness of the upper magnetic layer to that of the lower magnetic layer of 1/1 to 1/9, and the total coercive force of the upper and lower magnetic layers being at least 1,000 oersteds.

2. A magnetic recording medium according to claim 1, wherein the difference of the coercive force between the upper and lower magnetic layers is in the range of 100 to 500 oersteds.

3. A magnetic recording medium according to claim 1, wherein both of said upper magnetic layer and lower magnetic layer have a coercive force of from 2000 to 5000 oersteds.

4. A magnetic recording medium according to claim 3, wherein said upper magnetic layer has a coercive force of not more than 1500 oersteds.

* * * * *